United States Patent [19]

Caudy et al.

[11] 4,433,633

[45] Feb. 28, 1984

[54] CONTROLLED GAS GENERATOR SYSTEM

[75] Inventors: Don W. Caudy, Sunbury; Donald J. Hackman; John R. Myers, both of Columbus, all of Ohio; Robert T. Hoffman, Kailua, Hi.

[73] Assignee: The United States of America as represented by the Secretary of the Navy, Washington, D.C.

[21] Appl. No.: 368,933

[22] Filed: Apr. 16, 1982

[51] Int. Cl.³ .............................................. B63C 7/10
[52] U.S. Cl. ....................................... 114/54; 423/657
[58] Field of Search ............ 423/657, 648 R; 114/52, 114/53, 54; 441/31, 98, 99; 422/112, 114, 236, 305

[56] References Cited

U.S. PATENT DOCUMENTS

| | | | |
|---|---|---|---|
| 2,516,934 | 8/1950 | Weaver | 422/242 |
| 2,623,812 | 12/1952 | Eborall et al. | 422/224 |
| 3,291,572 | 12/1966 | Fatica | 422/112 |
| 3,453,086 | 7/1969 | Harm | 422/113 |
| 3,540,485 | 11/1970 | Kummins | 423/657 |
| 3,554,707 | 1/1971 | Holmes et al. | 422/123 |
| 3,649,360 | 3/1972 | Bloomfield et al. | 423/657 |
| 3,787,186 | 1/1974 | Geres | 422/113 |
| 4,055,632 | 10/1977 | Hoffman et al. | 423/657 |

Primary Examiner—Sherman D. Basinger
Attorney, Agent, or Firm—Robert F. Beers; Ervin F. Johnston; Thomas Glenn Keough

[57] ABSTRACT

A controlled gas generator system is provided which has a reaction chamber, the reaction chamber having top and bottom ends. A bed of reactant material is disposed within the chamber intermediate its top and bottom ends. Liquids are located within the chamber, one of the liquids being nonreactive with the reactant. The liquids are dissimilar in specific gravity so that the liquids interface substantially along a cross-sectional plane of the chamber. With this arrangement, gas will be produced when the interfacial plane is vertically disposed on one side of the bed of reactant material, and gas will not be produced when the interfacial plane is vertically disposed on an opposite side of the bed of reactant material. Provision is made for selectively adjusting the vertical position of the interfacial plane above or below the bed of reactant material so that gas can be selectively generated.

19 Claims, 9 Drawing Figures

DIVER'S CONSOLE

INITIATE REACTION

EMERGENCY STOP
EXCESS BUOYANCY

ASCENT

CONTROLLED GAS GENERATOR SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Variable buoyancy systems are commonly employed in salvaging objects from the ocean or positioning and recovering oceanographic instrumentation. These buoyancy systems may take several different forms, such as lift bags or ballast tanks. Historically, high-pressure air tanks have been utilized for deballasting such buoyancy systems. More recently, various materials have been reacted to generate a gas for deballasting the systems. Hydrazine is commonly reacted to generate a gas, and has been found highly satisfactory for raising objects from the ocean bottom. However, hydrazine is not cost effective and is very hazardous for personnel to handle.

Gas generated by reacting metallic hydrides is safer and considerably more cost effective than hydrazine. However, prior art metallic hydride gas generators could not be sufficiently controlled to perform their intended job functions. The specific problem associated with such prior art gas generators is in the starting and stopping of the reaction. In U.S. Pat. No. 4,055,632 to Robert T. Hoffman there is shown a controllable gas generator which utilizes metallic hydride pellets which are selectively released from a nonreactive liquid to a reactive liquid for the generation of gas. This generator is satisfactory for raising small objects, however, a more practical system is required for raising large objects from the ocean bottom. Also, the gas generator described in the patent will not terminate the generation of gas quickly since the pellets must be completely expended once they are disseminated into the reactive liquid.

STATEMENT OF THE OBJECTS OF THE INVENTION

An object of the present invention is to overcome the aforementioned problems associated with prior art gas generators.

Another object is to provide a gas generator which can be easily controlled to start and stop a gas producing reaction.

A further object is to provide a gas generator in which the starting and stopping of a reaction involving a metallic hydride can be substantially instantaneously started or stopped.

Still another object is to provide a controlled gas generator of the type utilizing a reactant, a nonreactive liquid, and a reactive liquid in which the reaction between the reactant and the reactive liquid can be stopped without requiring any pumping operation.

Still a further object is to provide a gas generator of the type utilizing a nonreactive liquid in which the amount of nonreactive liquid can be kept to a minimum.

Yet another object is to provide a method of generating gas which will efficiently control the starting and stopping of a reaction of gas producing materials.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
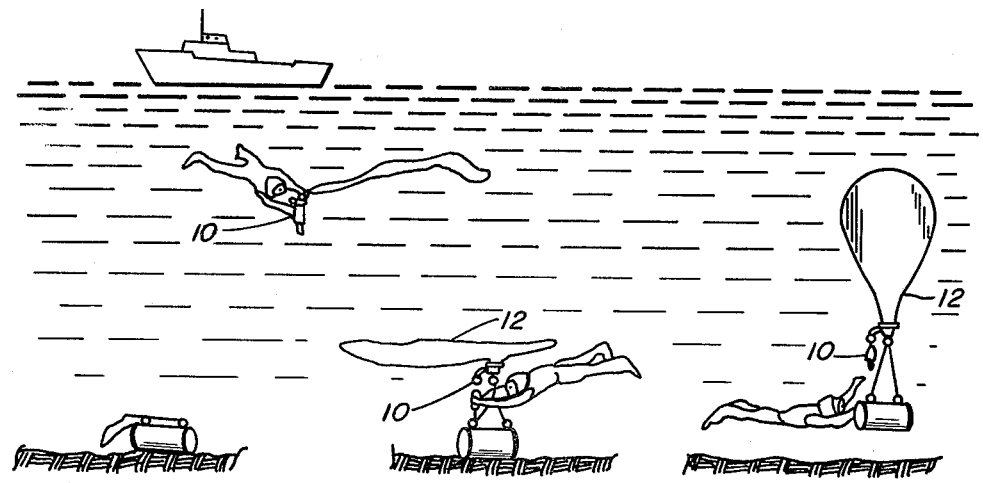
FIG. 1 is an ocean elevation view illustrating an exemplary use of the present invention for salvaging an object from the bottom of the ocean.

Referring now to the drawings wherein like reference numerals designate like or similar parts throughout the several views there is illustrated in FIG. 1 a practical utilization of the present invention for recovering an object from the ocean bottom. In this figure a diver is shown utilizing the controlled gas generator system 10 in combination with a lift bag pontoon 12.

Figure 3:
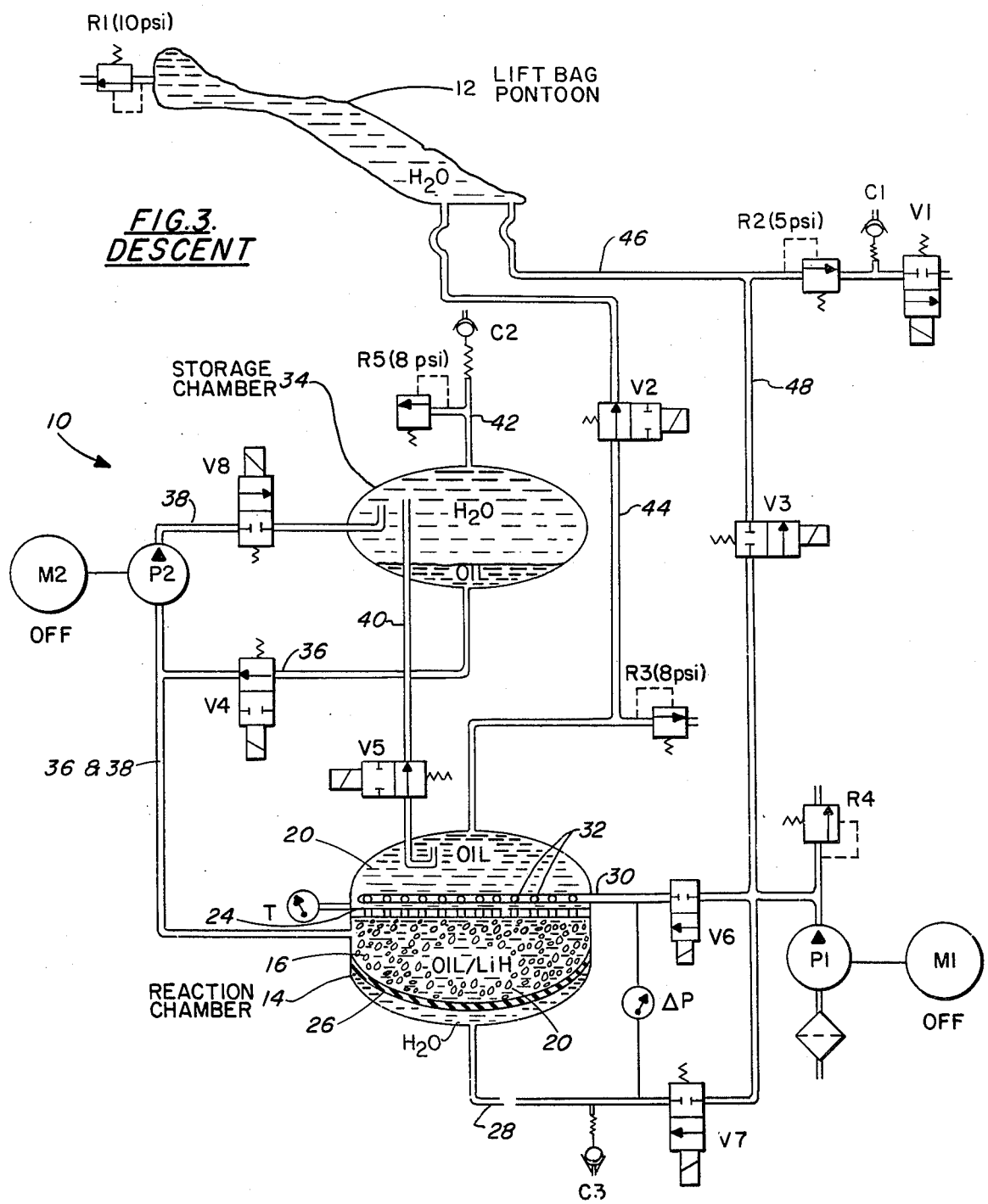
FIGS. 3 through 9 are schematic illustrations of the controlled gas generator system used with a lift bag pontoon with valves and pumps shown in different modes to accomplish the various desired salvaging operations.
Figure 4:
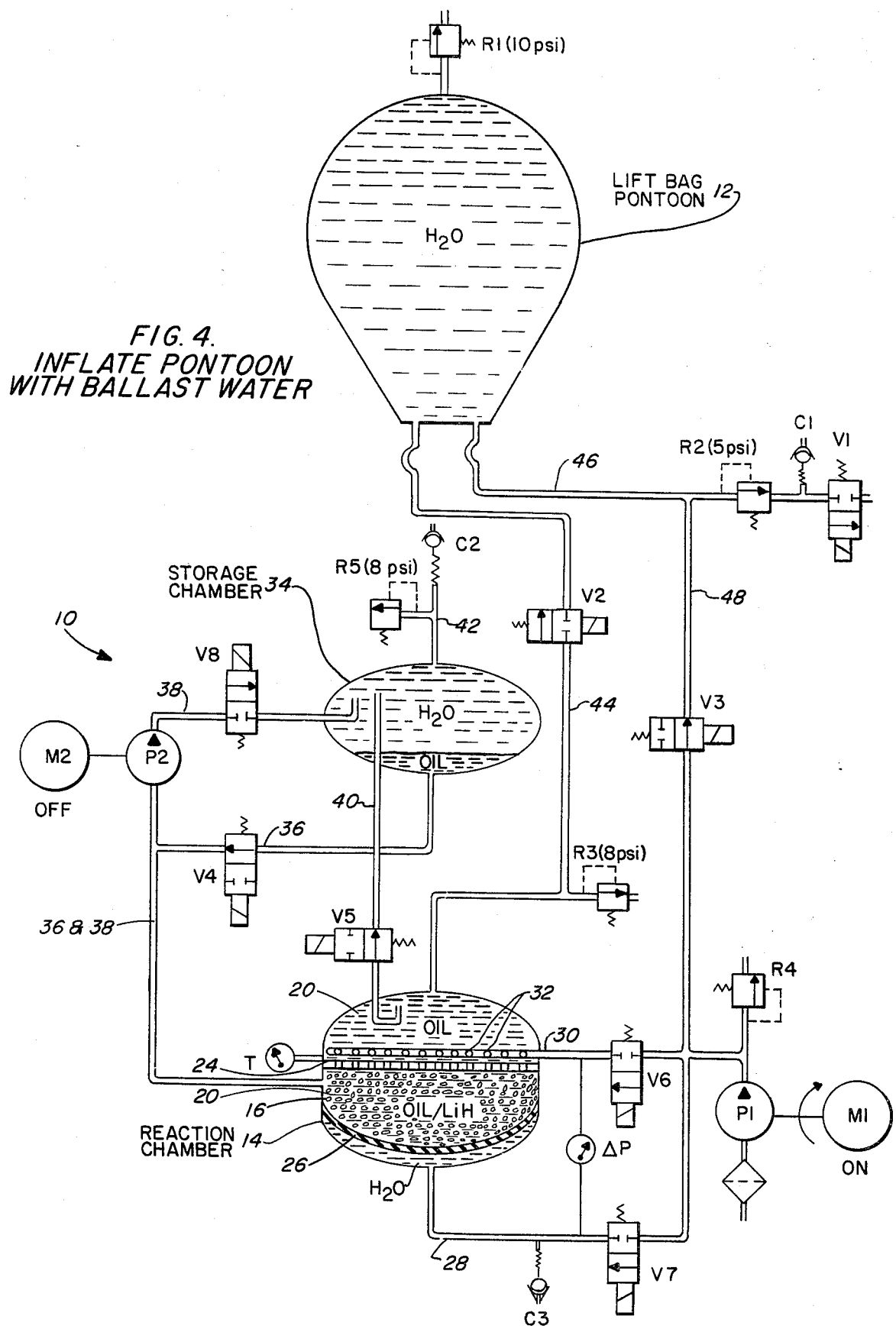
Figure 5:
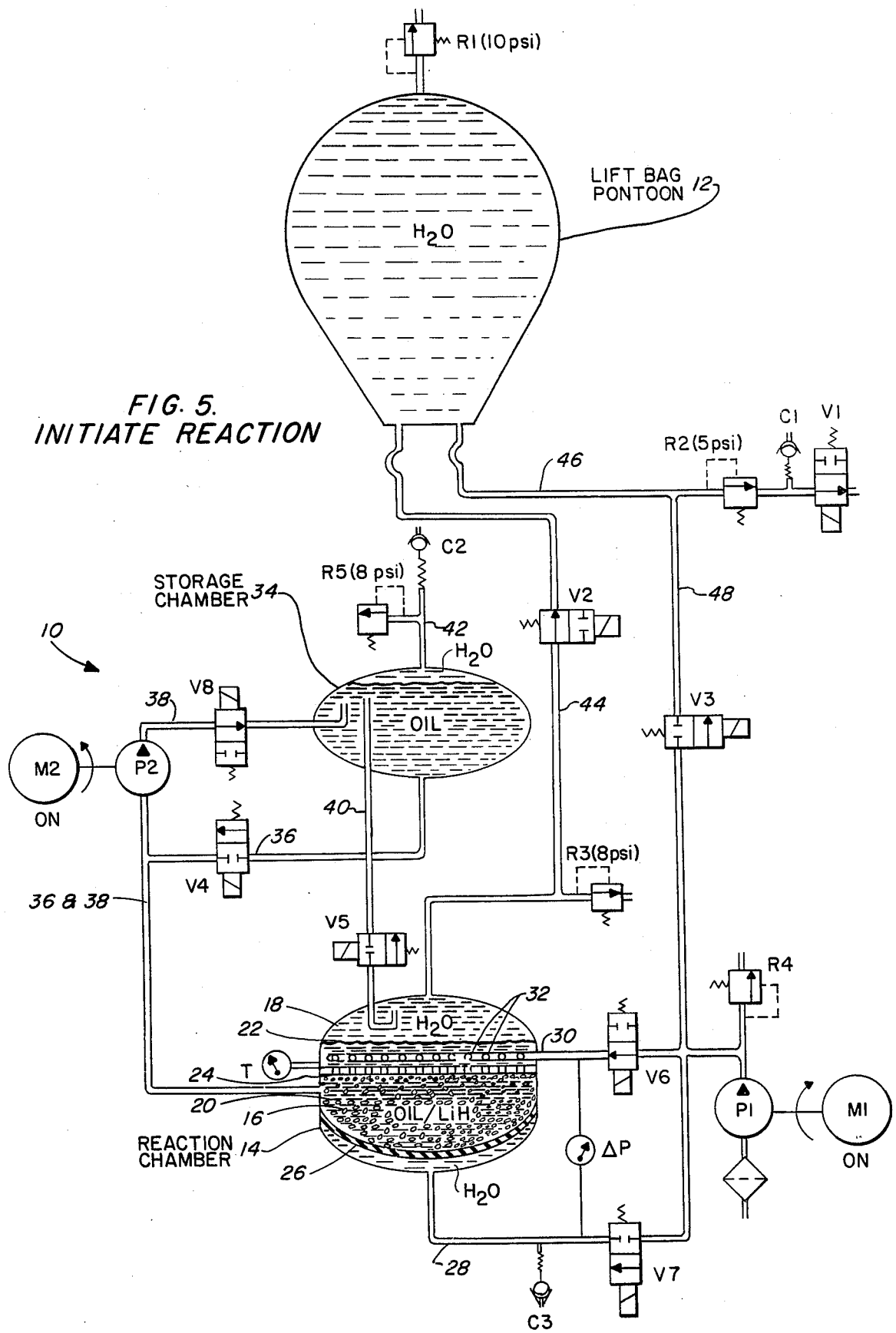

The elements for the controlled gas generation system 10 and the lift bag pontoon 12 are identical in FIGS. 3 through 9, the only difference being in the modes of the various valves, motors, and lift bag to accomplish the various salvage functions. Accordingly, description of the elements of the invention will simply be accomplished by reference to FIG. 5. As illustrated in FIG. 5, the gas generator system 10 includes a reaction chamber 14 which has top and bottom ends. A bed of reactant material 16 is disposed within the reaction chamber intermediate its top and bottom ends.

Figure 6:
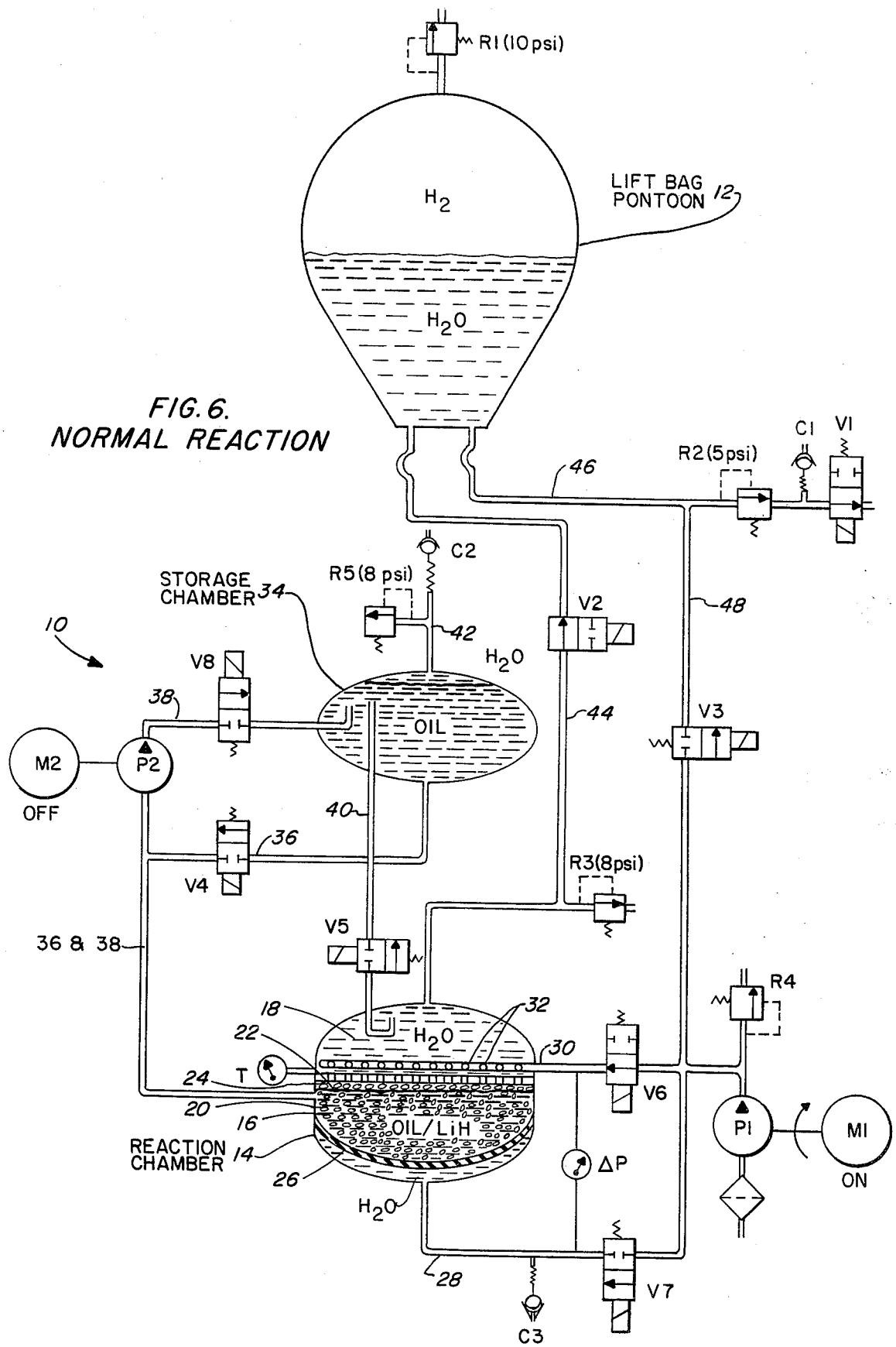

Liquids 18 and 20 are located within the chamber, one of the liquids 18 being reactive with the reactant 16 and the other liquid 20 being nonreactive therewith. The liquids have dissimilar specific gravities so that they will interface substantially along a cross-sectional plane 22 of the chamber. With this arrangement, gas will be produced when the interfacial plane is vertically disposed on one side of the bed of reactant material 16 and gas is not produced when the interfacial plane is vertically disposed on an opposite side of the bed of reactant material, the latter condition being illustrated in FIG. 5. Means, which will be described in detail hereinafter, are provided for selectively adjusting the vertical position of the interfacial plane 22 above or below the bed of reactant material 16 so that gas can be selectively generated. In FIG. 6 the interfacial plane 22 is shown below the bed of reactant material in which case gas is generated.

As illustrated in FIG. 5, the nonreactive liquid 20 may have a higher specific gravity than the reactive liquid 18. The reactant material 16 is shown as being in nodule form and has a specific gravity which is less than the specific gravity of the nonreactive liquid 20 so that the nodules will float therein. A perforated member or plate 24, which may simply be a screen, is mounted traversely across the entire reaction chamber 14 so as to provide a top containment of the reactant material. The perforated member 24 has perforations which are smaller in size than the nodular size of the reactant material 16. As shown in FIG. 5 the reactant material 16 and the nonreactive liquid 20 are both located below the screen 24 which causes the reactant material to be buoyed up against the bottom of the perforated member 24.

In the preferred embodiment, the reactant material 16 is lithium hydride, the reactive liquid 18 is water, and the nonreactive liquid 20 is fluorocarbon oil such as "Halocarbon" oil 13–21, which is the trademark for an oil obtainable from Halocarbon Products Corporation. The reactant material may be formed into cubes by using a combination of 10% Teflon and 90% lithium hydride powders compressed under high pressures in the order of 60,000 pounds per square inch. The cubes may be one inch and the perforated member may be 10 mesh screen so that the cubes are retained below the screen. The density of these lithium hydride cubes is approximately 0.8 and the density of the "Halocarbon" oil is approximately 1.9.

The nonreactive fluorocarbon oil 20 is somewhat expensive, and a unique feature has been employed for using a minimum amount of this oil in the system. This has been accomplished by providing a resilient diaphragm 26 which is mounted transversely across the entire reaction chamber between the screen 24 and the chamber bottom. The space below the diaphragm 26 is adapted to contain water, the volume of which can be selectively increased or decreased. A water line 28 is connected into the bottom of the reaction chamber for introducing water on the bottom side of the diaphragm 26, the water line 28 being connected to a pump P1. Interconnected in the water line 28 are a normally closed valve V7 and an intake check valve C3. Valve V7, as well as the other "V" numbered valves described herein, may be of the solenoid type wherein energization causes repositioning to a position opposite its normal position. When valve V7 is energized to the open position and pump P1 is operated water will be fed to the bottom of the reaction chamber 14 causing the diaphragm 26 to move upwardly to lessen the volumetric space between the diaphragm 26 and the screen 24. This operation will be utilized as the lithium hydride cubes 16 are used up in the reaction process. The result is a savings in the overall amount of fluorocarbon oil 20 which will be required to construct an operational embodiment of the invention.

The means for selectively adjusting the vertical position of the interfacial plane 22 of the liquids above or below the bed of reactant material may include a first reactive liquid line 30 which has a portion which extends transversely into the reaction chamber 14 in a spaced relationship above the perforated member or screen 24 and which has an outer end which is connectable to a pump, such as pump P1. In the preferred embodiment the inner portion of the liquid line 30 has a plurality of openings 32 distributed in an equally spaced relationship along its length. Control of the dissemination of reactive liquid into the chamber 14 may be accomplished by a normally closed solenoid valve V6 which is interconnected in the line 30 outside the chamber 14.

The selective adjusting means may further include a nonreactive liquid storage chamber 34 which is disposed above the reaction chamber 14. Any suitable means may be utilized for maintaining this positional relationship, such as a framework (not shown). A first nonreactive liquid line 36 interconnects the reaction chamber 14 below the screen 24 to the nonreactive liquid storage chamber 34 for allowing nonreactive liquid to flow by gravity from the storage chamber 34 to the reaction chamber 14. A normally open solenoid valve V4 is interconnected in the first nonreactive liquid line 36 for controlling the dissemination of nonreactive liquid by gravity flow. A second nonreactive liquid line 38 interconnects the reaction chamber 14 at a position below the perforated member 24 to the storage chanber 34. A pump P2 and a normally closed solenoid V8 are interconnected in the second nonreactive liquid line 38 for controlling the transfer of the nonreactive liquid from the chamber 14 to the storage chamber 34.

The selective adjusting means may still further include a second reactive liquid line 40 which interconnects the reaction chamber 14 above the perforated member 24 to the storage chamber 34. A normally open solenoid valve V5 may be interconnected in the second reactive liquid line 40 for controlling transfer of the reactive liquid from the chamber 14 to the storage chamber 34 as the reactive liquid is displaced by the incoming nonreactive liquid in the reaction chamber 14. A third reactive liquid line 42 may be connected into the top of the storage chamber 34 and may have a portion which extends outwardly therefrom. An intake check valve C2 and a relief valve R5 may be interconnected in parallel in the outwardly extending portion of the third reactive liquid line 42 for intaking or discharging reactive liquid as needed.

The foregoing describes a complete controlled gas generation system. This system may be utilized for the purpose of inflating the lift bag pontoon 12 with gas, such as hydrogen. The lift bag 12 has a top and a bottom when inflated, as illustrated in FIG. 5. A relief valve R1 is connected into the top of the lift bag for venting expanding gas during ascent. The operation of this lift bag can be more fully appreciated by referring to U.S. Pat. No. 4,078,509 entitled "Salvage Apparatus and Method".

In order to inflate the lift bag 12 a gas line 44 interconnects the top of the reaction chamber 14 with the lift bag 12. The gas line 44 is also capable of carrying reactive liquid to the lift bag 12, which in the preferred embodiment, would be water. A normally open solenoid valve V2 is interconnected in the line 44 for control purposes. Optionally, a relief valve R3 may be connected in the line 44 for preventing overpressure. A discharge reactive liquid line 46 is connected to the bottom of the lift bag 12 and has an outer ambient end portion. A normally closed solenoid valve V1 is interconnected in the line 46, and a relief valve R2 is interconnected in the line 46 between the valve V1 and the bottom of the lift bag 12. With this arrangement, reactive liquid, which is water in the preferred embodiment, can be discharged from the lift bag 12 when a predetermined overpressure is present. An intake check valve C1 may be interconnected in the line 46 between the valve V1 and the relief valve R2 for the purpose of relieving increasing ambient pressure between these two valves. An intake reactive liquid line 48, which would be a water line in the preferred embodiment, is interconnected between the pressure side of the pump P1 and the lift bag 12. A normally closed solenoid valve V3 may be interconnected in the line 48 for control purposes and a relief valve R4 may be provided for relieving overpressures. The line 48 and the valve V3 is not absolutely necessary since the lift bag 12 could be filled by the use of the line 30 provided proper control is maintained on the valve V6.

Figure 2:
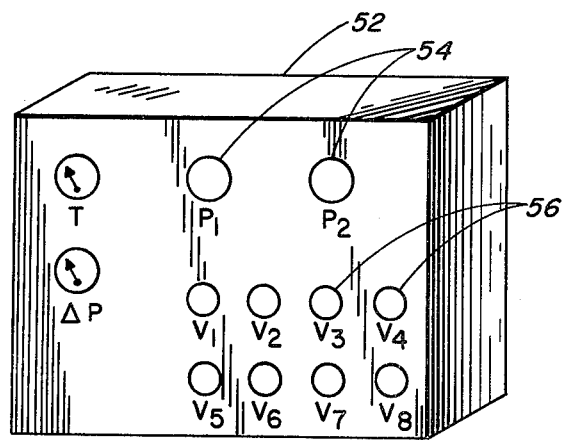
FIG. 2 is an isometric view of an exemplary console which can be utilized by a diver to control the present invention.

As can be seen in FIG. 5 motors M1 and M2 may be utilized for operating pumps P1 and P2, respectively. In the preferred embodiment, the relief valves are set at particular levels, namely: R1 is set at 10 psi, R2 is set at 5 psi, R3 is set at 8 psi, and R5 is set at 8 psi. Power for the gas generation system may be provided by a battery (not shown) which is electrically connected to the motors and all of the solenoid valves. Between the lines 28 and 30 there may be provided a pressure gage $\Delta P$ for indicating the differential pressure between these two lines. In the preferred operation of the invention it is desirable to maintain approximately 3 psi overpressure on the line 28 to the bottom of the diaphragm 26. Further, a temperature gage T may be connected into the reaction chamber 14 in the proximity of the perforated member 24 for reading the temperature of the reaction therein. As shown in FIG. 2, the gages for temperature and difference pressure may be mounted in a diver's console 52. The diver's console may also contain actuation switches 54 for the pumps P1 and P2, and actuation switches 56 for the solenoid valves V1 through V8.

METHOD OF THE INVENTION

The method of the invention for generating gas may include providing the reaction chamber 14 with a perforated member 24 mounted transversely therein between its top and the bottom; disposing reactive and nonreactive liquids 18 and 20 in the reaction chamber 14, the nonreactive liquid having a specific gravity which is greater than the specific gravity of the reactive liquid; disposing reactant nodules 16 in the nonreactive liquid below the perforated member 24 with a nodular size which is larger than the size of the perforations in the perforated member; and selectively adjusting the levels of the liquids 18 and 20 in the proximity of the perforated member 24 to generate the gas. The method of generating the gas may further include selectively disseminating reactive liquid into the reaction chamber 14 above the perforated member 24. The method may still further include selectively decreasing the reactant chamber volume for the nonreactive liquid and the reactant as the reactant is used up.

A summary of the functions for the various solenoid valves, relief valves, check valves and gages is provided herebelow in Table 1.

TABLE 1

| ITEM | FUNCTIONS |
|---|---|
| V1 Deballast Control Valve (N. C.) | Used to control the release of ballast water from the lift bag pontoon. |
| V2 Lift Bag Fill Control Valve (N. O.) | Controls the inlet of gas and water to the lift bag pontoon from the reaction chamber. |
| V3 Lift Bag Ballast Valve (N. C.) | Adds water to the lift bag pontoon for initial filling or for expelling excess gas to ballast down the lift bag pontoon. This valve is not absolutely necessary if the flow through V6 can be throttled to prevent stirring the oil above the lithium hydride and if the reaction can be perfectly controlled but, should the reaction run away, valve V3 adds an extra measure of safety by allowing V2 to be closed and water to be pumped into the lift bag pontoon to offset any gas being formed in the reaction chamber. |
| V4 Oil Dump Valve (N. O.) | Used to stop the reaction by allowing oil to flow by gravity from the storage chamber 34 to the reaction chamber 14. |
| V5 Pressure Equalization Valve (N. O.) | Used to allow water to flow from reaction chamber 14 to the storage chamber 34. It is open when V4 is open and closed when V4 is closed. |
| V6 Reaction Water Valve (N. C.) | Used to admit water to the reaction chamber for reacting with the lithium hydride. |
| V7 Diaphragm Control Valve (N. C.) | Used to admit water to the lower side of the diaphragm 26 as the lithium hydride is used up. |
| V8 Oil Stop Valve (N. C.) | Used to prevent oil flow between the storage chamber 34 and the reaction chamber 14 through the pump cavity P2. Oil flow could occur when pressure in the reaction chamber is higher or lower than that in the storage chamber. |
| R1 Lift Bag Relief (10 psi) | Used to exhaust expanding gas in lift bag pontoon as the lift bag ascends. |
| R2 Lift Bag Relief (5 psi) | Used to discharge lift bag water which is displaced by incoming gas. |
| R3 Reaction Chamber Relief (8 psi) | Used to prevent overpressure in reaction chamber. |
| R4 Pump P1 Relief | Used to prevent overpressure in lines from pump P1. |
| R5 Oil Chamber Relief (8 psi) | Prevents overpressure of the storage chamber during a depth change with the reaction proceeding, and V4, V5, and V8 closed. |
| C1 One-Way Check | Used to pressure balance system with ambient during depth change with V1 closed. |
| C2 One-Way Check | Used to pressure balance system with ambient during depth change with V4 and V5 closed. |
| C3 One-Way Check | Used to pressure balance system with ambient during depth change with V7 closed. |
| $\Delta P$ Differential Gage | Senses pressure differential across perforated member 24. Used to control V7 for inlet of water below diaphragm 26. |
| T Reaction Chamber Temperature Gage | Used to measure temperature of reaction in reaction chamber. |

OPERATION OF THE INVENTION

FIGS. 3 through 9 illustrate the various modes of operation of the present invention.

DESCENT

In FIG. 3 the valves are set so as to accomplish a descent of the generation system 10 and the lift bag 12 to the bottom of the ocean. To accomplish this the lift bag 12 is collapsed with possibly some water contained therein, the reaction chamber 14 is full of oil 20, and some excess oil is in the storage chamber 34. Pumps P1 and P2 are inactive, valves V2, V4, and V5 are open, and valves V1, V3, V6, V7, and V8 are closed. The entire system is in a pressure equalization mode during descent, which equalization is accomplished by the lift bag and the various check valves. The opening of valve V2 equalizes pressure between the lift bag 12 and the reaction chamber 14, the opening of valve V5 equalizes pressure between the reaction chamber 14 and the storage chamber 34 with any pressure difference with ambient being relieved by R5, and the opening of valve V4 ensures that the reaction chamber is maintained completely full of oil by gravity flow of the oil from the storage chamber 34.

INFLATE PONTOON WITH BALLAST WATER

After descent to the bottom, the lift system is attached to the object to be retrieved, as illustrated in FIG. 1. The lift bag is then completely filled with ballast water, as illustrated in FIG. 4. During this operation, pump P1 is operating, valves V3, V4, and V5 are open and valves V1, V2, V6, V7 and V8 are closed. The opening of valve V3 during the operation of pump P1 introduces the ballast water into the lift bag 12 via line 48. Again, the valve V5 in its open position maintains equalization of pressure between the chambers 12 and 34, and the opening of valve V4 ensures that chamber 14 remains completely filled with oil.

INITIATE REACTION

After the attachment of the lift system to the object, the diver then initiates a reaction which will cause the generation of hydrogen gas. During this operation, pumps P1 and P2 are operating, valves V1, V2, V6, and V8 are open and valves V3, V4, V5, and V7 are closed. By opening valve V1, the pontoon is readied for discharging water via the relief valve R2, the opening of valve V2 readies the lift bag for receiving gas generated by the reaction chamber 14, the opening of valve V6 introduces water into the reaction chamber to cause a reaction with the lithium hydride, and the opening of valve V8 enables the oil 20 in the reaction chamber 14 to be pumped upwardly and into the storage chamber 34. In FIG. 5 it can be seen that the interfacial plane 22 between the water and the oil has dropped in the reaction chamber 14, but has not yet reached the bed of lithium hydride nodules 16. As soon as this interfacial plane reaches the bed of lithium hydride the water will react therewith and cause the generation of hydrogen gas for displacing the water within the lift bag 12.

NORMAL REACTION

In FIG. 6, the interfacial plane 22 is shown slightly below the perforated member 24 which allows the water to react with the lithium hydride and generate hydrogen gas. The operation as shown in FIG. 6 can be considered to be a normal reaction for generating such gas. During this operation, pump P1 is operating and P2 is off, valves V1 and V2 are open, and valves V3, V4, V5, and V8 are closed. Valve V6 is normally open and valve V7 is normally closed but are occasionally pulsed in the opposite directions to raise the diaphragm 26 and make the space between the diaphragm and the perforated member 24 smaller because of the expenditure of the lithium hydride during the reaction. Also, P2 can be operated and valve V8 pulsed in an opposite direction if the oil level becomes too high in the reaction chamber 14 to maintain the desired reaction speed. Reaction speed will also be indicated by the temperature gage T. The opening of valve V1 continues to allow the water in the lift bag 12 to be displaced by the hydrogen, and the opening of valve V2 enables the hydrogen to be transferred between the reaction chamber 14 and the lift bag 12.

STOP REACTION UNDER NORMAL CONDITIONS

Figure 7:
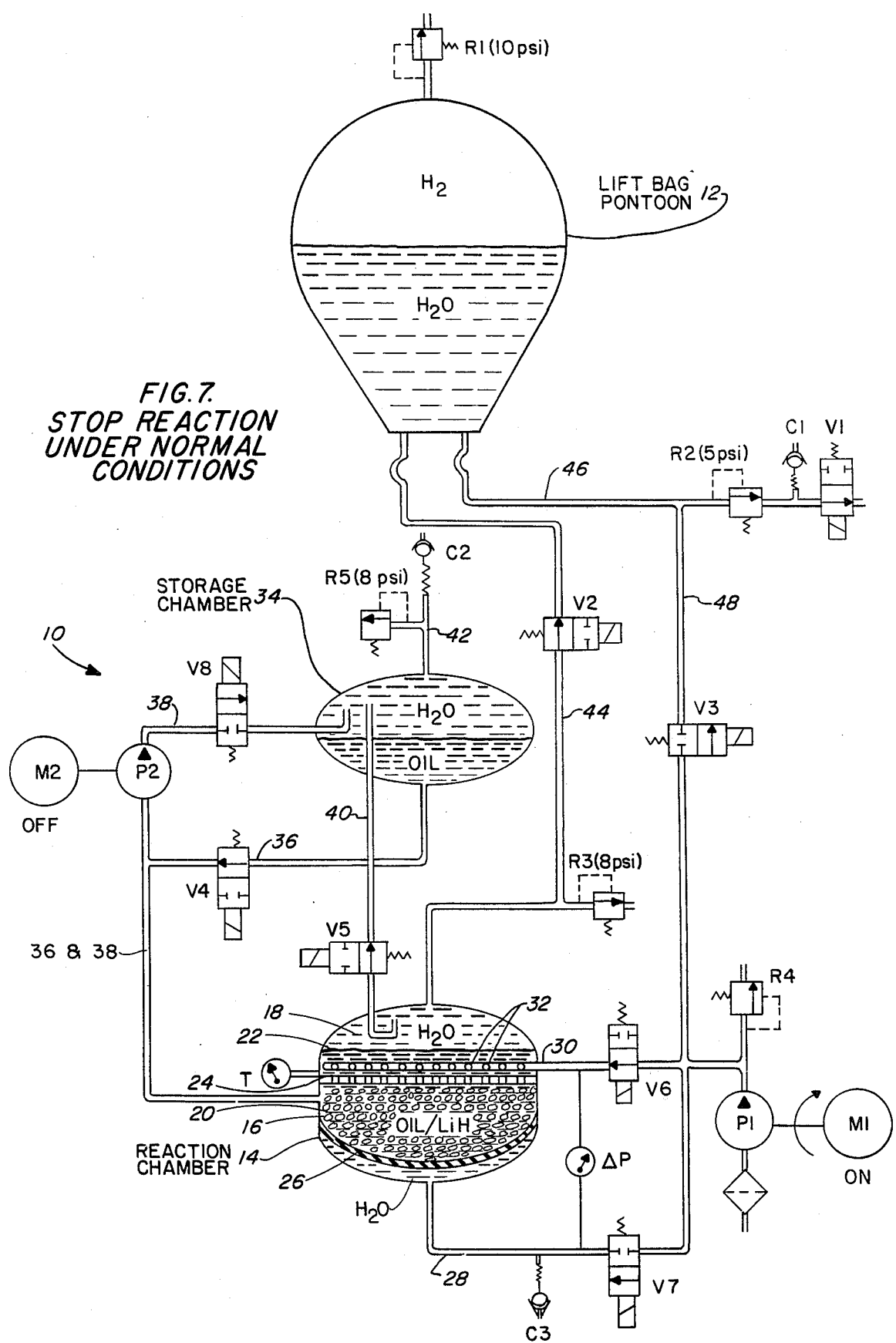

Should the diver desire to stop the reaction in the chamber 14, he would operate the pumps and valves as shown in FIG. 7. In this operation, pump P1 is operating and pump P2 is off, valves V1, V2, V4, V5 and V6 are open, and valves V3, V7, and V8 are closed. By opening valve V4 oil flows via gravity from the storage chamber 34 downwardly into the reaction chamber 14 causing the interfacial plane 22 to rise above the bed of lithium hydride and the reaction is stopped. By opening valves V2, V5 and V6 water enters the storage chamber 34 to take the place of the oil displaced therefrom, and the excess water not required for displacement goes through valve V2 into the lift bag and out into ambient ocean water via valve V1.

EMERGENCY STOP EXCESS BUOYANCY

Figure 8:
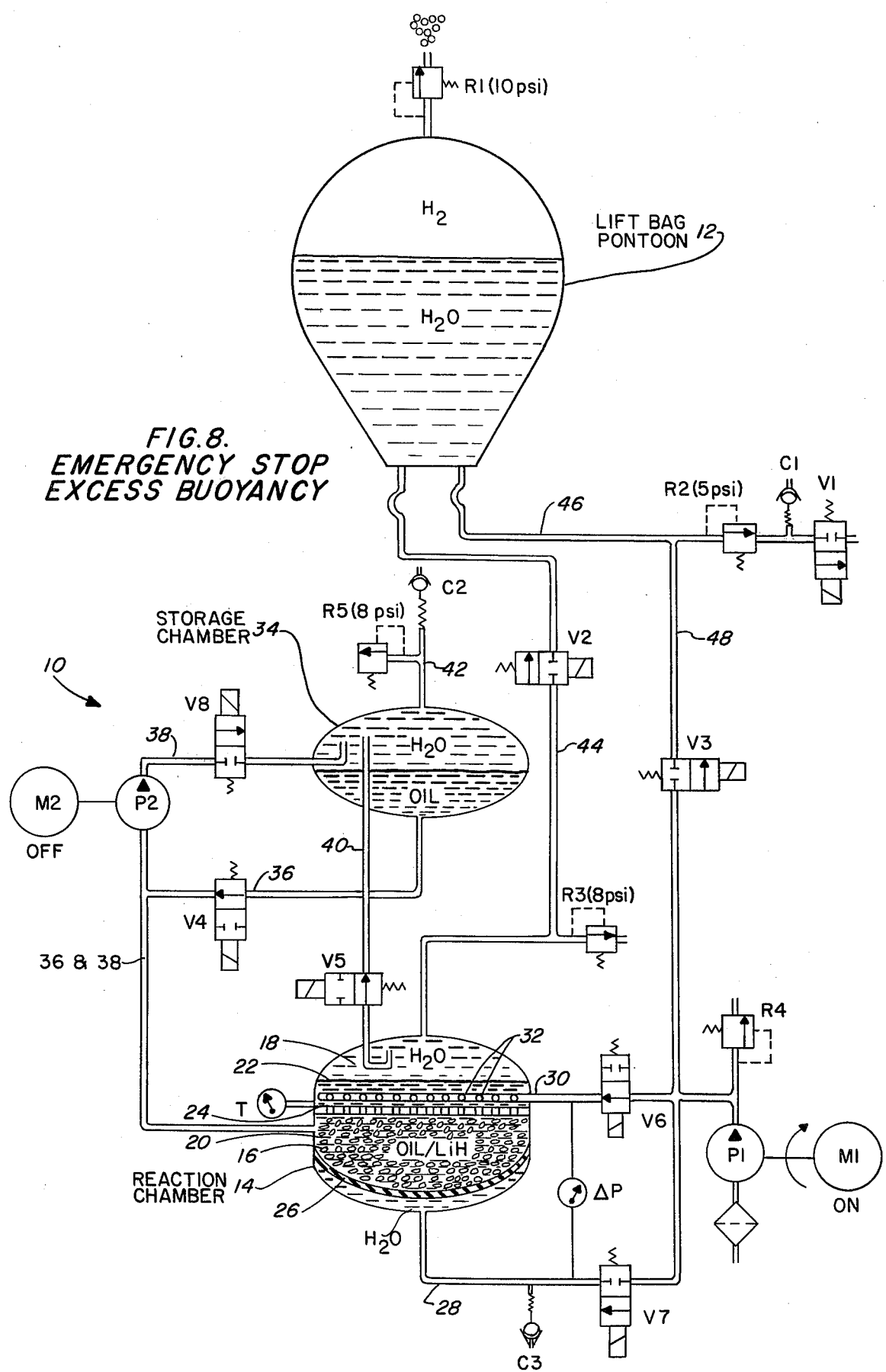

Should the lift bag become excessively buoyant, the diver can bring about an emergency stop of the reaction by operating the pumps and valves shown in FIG. 8. During this operation, pump P1 is operating and pump P2 is off, valves V4 and V5 are open, and valves V1, V2, and V8 are closed. Valve V3 is pulsed intermittently as desired to admit water to the lift bag to decrease its buoyancy, valve V7 may be pulsed intermittently to keep the diaphragm 26 high, and valve V6 may be generally kept open but pulsed closed when valve V7 is pulsed open to put pressure on the diaphragm. When valve V3 is pulsed to an open position, water will displace the hydrogen gas in the lift bag to decrease its buoyancy. With valve V4 open oil flows by gravity from the storage chamber 34 downwardly into the reaction chamber 14 to raise the interfacial plane 22 between the oil and the water above the bed of lithium hydride, thus stopping the reaction. Oil displaced from the storage chamber 34 is replaced by water introduced through valves V6 and V5.

ASCENT

Figure 9:
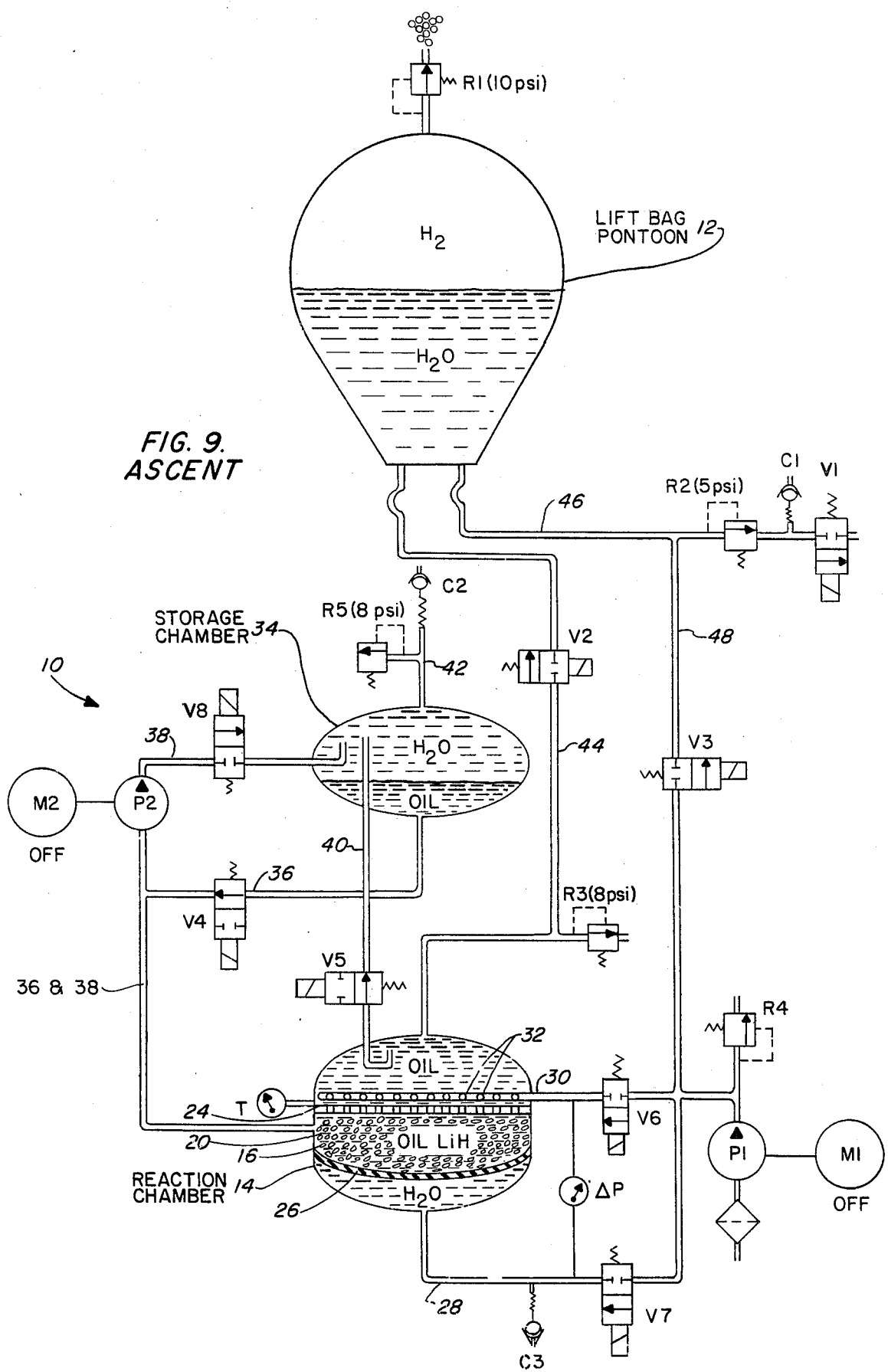

Once the lift bag 12 has received enough hydrogen to commence an ascent, the entire system is closed down, as illustrated in FIG. 9. Only valves V4 and V5 are open which allows the reaction chamber to be maintained full of oil via valve V4 and pressures to be equalized between the chambers via valve V5. During this operation, relief valve R1 at the top of the lift bag 12 will vent expanding gas from the lift bag as the entire system ascends in the water. The diaphragm 26 is shown moved upwardly to lessen the space between the diaphragm 26 and the perforated member 24 due to the expenditure of the lithium hydride.

If desired, all of the solenoid valves V1 through V8 could be automatically operated according to a computer program, in which case a suitable microprocessor could be utilized in combination with the generation system. Further, all of the solenoid valves V1 through V8 could be replaced by manually operated on-off gate valves, however this substitution would be somewhat more difficult for a diver to operate.

Obviously, many other modifications and variations of the present invention are possible in the light of the above teachings. It is therefore to be understood that within the scope of the appended claims the invention may be practiced otherwise than as specifically described.

What is claimed is:
1. A gas generator comprising:
 a reaction chamber having top and bottom ends;
 a perforated member mounted transversely across the entire reaction chamber for containing a reactant material between the perforated member and one end of the reaction chamber;
 the reaction chamber being adapted to contain liquids which have dissimilar specific gravities, one of the liquids being reactive with the reactant and another of the liquids being nonreactive with the reactant, the reactive and nonreactive liquids having a mutual interface;

means connected to the reaction chamber for selectively moving the interface of the liquids above or below the perforated member;

a resilient diaphragm mounted transversely across the reaction chamber; and a line connected into the reaction chamber for introducing fluid on one side of the diaphragm so as to reduce the volume between the diaphragm and the perforated member.

2. A gas generator comprising:

a reaction chamber having top and bottom ends;

a perforated member mounted transversely across the entire reaction chamber for containing a reactant material between the perforated member and one end of the reaction chamber;

the reaction chamber being adapted to contain liquids which have dissimilar specific gravities, one of the liquids being reactive with the reactant and another of the liquids being nonreactive with the reactant, the reactive and nonreactive liquids having a mutual interface;

means connected to the reaction chamber for selectively moving the interface of the liquids above or below the perforated member, said means including:

a first reactive liquid line having a portion which transversely extends into the reaction chamber in a spaced parallel relationship to the perforated member and having an outer end which is adapted to be connected to a pump;

a nonreactive liquid storage chamber disposed at a level which is different than the level of the reaction chamber, the storage chamber having top and bottom ends;

a first nonreactive liquid line interconnecting the reaction chamber on one side of the perforated member with the nonreactive liquid storage chamber for allowing the nonreactive liquid to flow by gravity between the chambers;

a valve interconnected in the first nonreactive liquid line;

a second nonreactive liquid line interconnecting the reaction chamber on the same side of the perforated member with the nonreactive liquid storage chamber; and a pump and a valve interconnected in the second nonreactive liquid line.

3. A gas generator as claimed in claim 2 wherein the means for selectively moving the liquid interface further includes:

a second reactive liquid line interconnecting the reaction chamber on an opposite side of the perforated member with the nonreactive liquid storage chamber;

a third reactive liquid line connected through one end of the storage chamber and having an outwardly extending portion; and an intake check valve and a relief valve interconnected in parallel in the outwardly extending portion of the third reactive liquid line.

4. A gas generator as claimed in claim 3 including: the reactant material and the liquids.

5. A gas generator as claimed in claim 4 including:

the specific gravity of the nonreactive liquid being greater than the specific gravity of the reactive liquid;

the storage chamber being located above the reaction chamber;

the first and second nonreactive liquid lines being connected into the reaction chamber below the perforated member, and the first nonreactive liquid line being connected through the bottom of the storage chamber;

the second reactive liquid line being connected into the top of reaction chamber.

6. A gas generator as claimed in claim 5 including:

the reactant material being located below the perforated member and having a specific gravity less than the specific gravity of the nonreactive liquid; and the reactant material being in nodular form of a size larger than the perforations in the perforated member so that the nonreactive material buoys the nodules of reactant material up against the bottomside of the perforated member.

7. A gas generator as claimed in claim 6 including:

a diaphragm sealably connected across the reaction chamber below the perforated member; and a line connected into the bottom of the reaction chamber and having an outer end which is connectable to a pump for introducing fluid into the bottom of the reaction chamber to reduce the volumetric space between the diaphragm and the perforated member.

8. A gas generator as claimed in claim 7 including:

the reactant being lithium hydride;

the reactive liquid being water; and the nonreactive liquid being fluorocarbon oil.

9. An apparatus as claimed in claim 8 including:

a lift bag pontoon having a top and a bottom when inflated;

a relief valve connected in the top of the lift bag;

a water and gas line interconnecting the top of the reaction chamber to the lift bag;

a water discharge line connected to the bottom of the lift bag;

a valve and a relief valve interconnected in series in the water discharge line; and a water intake line connected to the lift bag and having an outer end which is connectable to a pump.

10. A gas generator comprising:

a reaction chamber having top and bottom ends;

a bed of reactant material disposed within the chamber intermediate its top and bottom ends;

liquids heated within the chamber, one of the liquids being reactive with the reactant and the other liquid being nonreactive with the reactant;

the nonreactive liquid having a higher specific gravity than the reactive liquid so that the liquids interface substantially along a cross-sectional plane of the chamber whereby gas is produced when the interfacial plane is vertically disposed on one side of the bed of reactant material and gas is not produced when the interfacial plane is vertically disposed on an opposite side of the bed of reactant material;

the reactant material being nodular and having a specific gravity which is less than the specific gravity of the nonreactive liquid;

a perforated member mounted transversely across the reaction chamber and having perforations which are smaller in size than the size of the reactant material;

the reactant material being disposed in the nonreactive liquid so as to be buoyed up against the bottom of the perforated member; and means for selectively adjusting the vertical position of the interfacial plane above or below the bed of reactant material so that gas can be selectively generated.

11. A gas generator as claimed in claim 10 wherein the selective adjusting means includes:

a first reactive liquid line which has a portion which extends transversely into the reaction chamber in a spaced relationship above the perforated member and which has an outer end which is connectable to a pump.

12. A gas generator as claimed in claim 11 wherein the selective adjusting means further includes:

a nonreactive liquid storage chamber disposed above the reaction chamber;

a first nonreactive liquid line interconnecting the reaction chamber below the perforated member with the bottom of the nonreactive liquid storage chamber for allowing nonreactive liquid to flow by gravity from the nonreactive liquid storage chamber to the reaction chamber;

a valve interconnected in the first nonreactive liquid line;

a second nonreactive liquid line interconnecting the reaction chamber below the perforated member with the nonreactive liquid storage chamber;

a pump and a valve interconnected in the second nonreactive liquid line.

13. A gas generator as claimed in claim 12 wherein the selective adjusting means further includes:

a second reactive liquid line interconnecting the reaction chamber above the perforated member to the nonreactive liquid storage chamber;

a third reactive liquid line connected into the top of the nonreactive liquid storage chamber and having an outwardly extending portion; and an intake check valve and a relief valve interconnected in parallel in the outwardly extending portion of the third reactive liquid line.

14. A gas generator as claimed in claim 13 including:
the reactant being lithium hydride;
the reactive liquid being water; and
the nonreactive liquid being fluorocarbon oil.

15. A gas generator as claimed in claim 14 including:
the first reactive liquid line having a plurality of openings therealong.

16. An apparatus as claimed in claim 15 including:
a water pump;
a lift bag pontoon having a top and a bottom when inflated;
a relief valve connected into the top of the lift bag for venting expanding gas therefrom;
a water and gas line interconnecting the top of the reaction chamber with the lift bag;
a discharge water line connected to the bottom of the lift bag and having an outer ambient end;
a discharge valve interconnected in the bag discharge water line and a relief valve interconnected in the same water line between the bottom of the lift bag and the discharge valve;
an intake water line interconnecting the pressure side of the pump with the lift bag; and
a valve interconnected in the lift bag intake water line.

17. A method of generating gas comprising the steps of:
providing a reaction chamber having a top and a bottom with a perforated member mounted transversely therein between said top and bottom;
disposing reactive and nonreactive liquids in the reaction chamber; the nonreactive liquid having a specific gravity which is greater than the specific gravity of the reactive liquid;
disposing reactant nodules in the nonreactive liquid below the perforated member with a nodular size which is larger than the size of the perforations in the perforated member; and
selectively adjusting the levels of the liquids in the proximity of the perforated member to generate gas.

18. A method as claimed in claim 17 including the steps of:
selectively disseminating reactive liquid into the reaction chamber above the perforated member.

19. A method as claimed in claim 17 including the steps of:
selectively decreasing the chamber volume for the reactant as the reactant is used up.

* * * * *